United States Patent Office 3,050,543
Patented Aug. 21, 1962

3,050,543
PHOSPHONIUM PHOSPHATES
Thomas Mason Melton, Richmond, Va., assignor to Virginia-Carolina Chemical Corporation, Richmond, Va., a corporation of Virginia
No Drawing. Filed Nov. 24, 1961, Ser. No. 154,860
29 Claims. (Cl. 260—461)

The present invention relates to compounds of the general formula $$[R^1_3R^2PX]_mP(X)(XR^3)_n$$

wherein $R^1$ is a member of the group consisting of lower alkyl groups containing from 1 to 5 carbon atoms, hydroxy-substituted lower alkyl, halo-substituted lower alkyl, phenyl, halo-substituted phenyl, lower alkyl substituted phenyl, benzyl, halo-substituted benzyl, and naphthyl, $R^2$ has the same meaning as $R^1$, $R^3$ is a member of the group consisting of alkyl groups containing from 1 to 12 carbon atoms, phenyl, lower alkyl-substituted phenyl and halo-substituted phenyl, X is a member of the group consisting of oxygen and sulfur and $m$ and $n$ are whole numbers from 1 to 2, their sum being 3. The invention further relates to compositions of these compounds and inert carriers therefor, a process for the manufacture of the compounds and methods for arresting plant growth with these compounds.

The new compounds may be obtained by reacting a phosphonium halide of the formula $$R^1_3R^2PY$$

where $R^1$ and $R^2$ have the same meaning as above and Y is a halogen, with a compound of the formula $$(HX)_mP(X)(XR^3)_n$$

where $R^3$, X, $m$ and $n$ have the same meanings as above.

Methods for preparing the starting materials are well known in the art. For example, the phosphonium halides may be prepared by a preferred method which involves the addition of a slight excess (ca. 5%) of the appropriate organic halide to a cold solution of an organic phosphine in an inert solvent. After a brief heating period to complete the reaction, solvent and excess halide are removed.

A diester of phosphoric acid may be prepared by the addition of substantially two moles of an alcohol or phenol to phosphorus oxychloride, separation of the desired chloride from the mixture, and hydrolysis of the phosphorochloridate. Alternately, three moles of an alcohol or phenol may be reacted with one mole of phosphorus pentoxide to form a mixture of monoester phosphate and diester phosphate. This mixture can be separated to obtain the desired member.

Phosphorus compounds containing sulfur or a mixture of sulfur and oxygen linkages can also be prepared by using standard methods. For example, an O,O-dialkyl phosphorodithioic acid can be prepared by reacting substantially four moles of an alcohol with substantially one mole of phosphorus pentasulfide. As a further example, an S,S-dialkyl phosphorodithioate $[(RS)_2P(O)OH]$ can be prepared by reacting two moles of an alkyl mercaptan with one mole of phosphorus trichloride, hydrolysis of the phosphorochloridite and oxidation of the resulting hydrolysis product.

The reaction to form the phophonium phosphate may be carried out in an inert organic solvent using an organic amine as the halogen acid acceptor. These amines will include mono-, di-, and trialkyl amines such as mono-, di-, and trimethylamine, mono-, di-, and triethylamine, mono-, di-, and tripropylamine, and the like, saturated cyclic amines such as cyclohexylamine and the like, and aromatic amines such as pyridine. Anhydrous ammonia may also be used. Useful organic solvents include benzene, toluene and chlorobenzene. Others will be obvious to those skilled in this art. Alternately, the reaction may be carried out in aqueous media, employing an alkali metal hydroxide as the acid acceptor. Whether run in inert organic solvent or aqueous medium, the reaction is only mildly exothermic. The reaction can be run at somewhat above room temperature, but gentle reflux for from a few minutes to several hours will usually be required to complete it.

After the reaction is complete, the amine hydrohalide may be washed out with water, or it may be filtered. If desired, a combination of these may be used. Where the reaction is run in aqueous media, it is usually expedient to add a water immiscible solvent such as benzene to remove the product from the mixture. The solvent may be washed with water, or water in combination with other appropriate agents, and then removed under reduced pressure, leaving a phosphonium phosphate residue.

The following examples will further illustrate the invention. It is to be understood that they are for purposes of illustration only. Many other compounds will be suggested to those having skill in this art, and it is intended that all compounds which become obvious from these examples and the remainder of the disclosure will properly come within the scope of this invention. Parts are by weight.

*Example 1*

Tetrabutylphosphonium O,O-dibutyl phosphorodithioate $$(C_4H_9)_4PBr + (C_4H_9O)_2P(S)SH + (C_2H_5)_3N$$
$$\rightarrow (C_4H_9)_4PSP(S)(OC_4H_9)_2 + (C_2H_5)_3N \cdot HBr$$

Thirty-three and nine-tenths parts of tetrabutylphosphonium bromide, 24.2 parts of O,O-dibutyl phosphorodithioic acid and 10.1 parts of triethylamine were each dissolved in 44.0 parts of benzene. The benzene solutions of acid and bromide were mixed. No discernible reaction occurred. The benzene-amine solution was added, whereupon a mildly exothermic reaction ensued. The mixture was allowed to stand for approximately 48 hours, the amine hydrochloride was removed by filtration, and the benzene was removed under reduced pressure (to 30 mm.) at temperatures up to 100° C. In this manner, 45.9 parts of product were obtained, representing a yield of 86% based on either reactant. The product had the following properties:

Refractive index at 27° C.—1.5104; sp. gr. $\frac{20}{4}$ —1.033;

P (calc. for $C_{24}H_{54}O_2P_2S_2$)—12.35%; found—11.78% P.

*Example II*

2,4-dichlorobenzyltributylphosphonium bis(2-ethylhexyl) phosphate $$2,4\text{-}Cl_2C_6H_3CH_2(C_4H_9)_3PCl + HOP(O)$$
$$(OC_8H_{17})_2 + NaOH \rightarrow 2,4\text{-}Cl_2C_6H_3CH_2$$
$$(C_4H_9)_3POP(O)(OC_8H_{17})_2 + NaCl$$

Forty-four parts of 2,4-dichlorobenzyltributylphosphonium chloride and 32.3 parts of bis(2-ethylhexyl) phosphate were placed together in 80 parts of water. 4.4 parts of sodium hydroxide was dissolved in 4 parts of water and added to the chloride-phosphate mixture. The mixture was heated at reflux for 2 hours and then was cooled to room temperature. 44 parts of benzene was added to the aqueous reaction mixture to remove the product therefrom. The benzene was separated from the aqueous layer, washed with three 50-part portions of water and then was fractionally distilled under reduced pressure at temperatures up to 100° C. at pressures to 30 mm. A quantitative yield of product was obtained. The product had the following properties:

Refractive index at 27° C.—1.4927; sp. gr. $\frac{20}{4}$ —1.055;

P (calcd. for $C_{35}H_{66}Cl_2O_4P_2$) 9.07%; found 8.60% P. Cl (calcd. for $C_{35}H_{66}Cl_2O_4P_2$) 10.40%; found 10.44% Cl.

*Example III*

2,4-dichlorobenzyltributylphosphonium S,S-dibutyl phosphorodithioate

$2,4\text{-}Cl_2C_6H_3CH_2(C_4H_9)_3PCl + (C_4H_9S)_2P(O)OH + (C_2H_5)_3N \rightarrow 2,4\text{-}Cl_2C_6H_3CH_2(C_4H_9)_3POP(O)(SC_4H_9)_2 + (C_2H_5)_3N\cdot HCl$ Thirty-nine and eight-tenths parts of 2,4-dichlorobenzyl-tributylphosphonium chloride and 24.2 parts of S,S-dibutyl phosphorodithioate were placed in 176 parts of benzene. 10.1 parts of triethylamine in 44 parts of benzene was added to the mixture, whereupon a small quantity of crystals precipitated. After standing overnight, the amount of crystals had not increased. After heating at reflux for 3 hours, the mixture was cooled and allowed to stand for approximately 12 hours. Still only a few crystals were in evidence, but crystallization of amine hydrochloride finally occurred upon cooling in an ice-salt bath. The crystals were removed by filtration and the benzene was removed to 100° C. and to 30 mm., leaving an oily residue which crystallized on standing. All of the crystals (hydrochloride and product) were redissolved in 88 parts of benzene and washed with two 100-part portions of water, two 100-part portions of 3.5% NaOH and finally with two 100-part portions of water. The benzene was fractionally distilled to 100° C. to a pressure of 30 mm., leaving 43.2 parts of an oily residue having the following analysis:

S (calcd. for $C_{27}H_{50}Cl_2O_2P_2S_2$) 10.63%; found 11.09% S.

*Example IV*

Preparation of bis(2,4-dichlorobenzyltributylphosphonium) 2-ethylhexyl phosphate

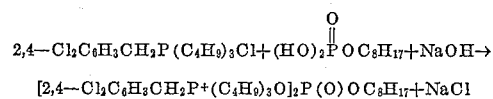

$[2,4\text{-}Cl_2C_6H_3CH_2P^+(C_4H_9)_3]_2P(O)OC_8H_{17} + NaCl$

A mixture of 19.9 parts (0.5 mole) of 2,4-dichlorobenzyltributylphosphonium chloride, 5.25 parts (0.025 mole) of 2-ethylhexyl phosphate, and 2.2 parts (0.55 mole) of sodium hydroxide in 22 parts of water were heated at reflux for 2 hours. The mixture was cooled to room temperature, and 44 parts of benzene was added. The layers were separated, and the benzene layer was washed three times with 25 cc. of water. The benzene was removed by stripping to 100° C. at 30 mm. to give 17.8 g. (76.3%) of bis(2,4-dichlorobenzyltributylphosphonium) 2-ethylhexyl phosphate as a very viscous liquid. The product had the following analysis:

Calcd.: P, 9.98; Cl, 14.20. Found: P, 9.79; Cl. 14.58.

Other compounds which may be prepared as above and which come within the scope of this invention are as follows:

| $R^1{}_3R^2PXP(X)(XR_3)_2$ | $[R^1{}_3R^2PX]_2P(X)XR_3$ |
|---|---|
| $(CH_3)_4POP(O)(OCH_3)_2$ | $[(CH_3)_4PO]_2P(O)OCH_3$ |
| $(HOCH_2)_4POP(O)(OC_{12}H_{25})_2$ | $[(HOCH_2)_4PO]_2P(O)OC_{12}H_{25}$ |
| $(ClCH_2)_4POP(O)(OC_4H_9)_2$ | $[(ClCH_2)_4PO]_2P(O)OC_4H_9$ |
| $(CH_3)(C_2H_5)_3POP(O)(O\text{-}C_6H_4\text{-}CH_3)_2$ | $[(CH_3)(C_2H_5)_3PO]_2P(O)O\text{-}C_6H_4\text{-}CH_3$ |
| $(C_3H_7)(C_4H_9)_3POP(O)(S\text{-}C_6H_4\text{-}Cl)_2$ | $[(C_3H_7)(C_4H_9)_3PO]_2P(O)S\text{-}C_6H_3Cl_2$ |
| $(C_4H_9)_3(C_6H_4\text{-}CH_2)POP(O)(O\text{-}C_6H_3Cl_2)_2$ | $[(C_4H_9)_3(C_6H_4\text{-}CH_2)PO]_2P(O)O\text{-}C_6H_3Cl_2$ |
| $(CH_3)_3(C_6H_4)POP(O)(O\text{-}C_6H_4\text{-}C_4H_9)_2$ | $[(CH_3)_3(C_6H_4)PO]_2P(O)O\text{-}C_6H_4\text{-}C_4H_9$ |
| $(ClC_2H_4)(C_2H_5)_3PSP(S)(O\text{-}C_6H_4\text{-}Cl)_2$ | $[(CH_3\text{-}C_6H_4)_4PO]_2P(O)OC_3H_7$ |
| $(C_6H_5)_3(Cl\text{-}C_6H_3\text{-}CH_2)PSP(S)(O\text{-}C_6H_4\text{-}Br)_2$ | $[(C_6H_5\text{-}CH_2)_4PO]_2P(O)OC_5H_{11}$ |
| $(CH_3\text{-}C_6H_4)_4POP(O)(OC_3H_7)_2$ | $[(Cl\text{-}C_6H_4\text{-}CH_2)_4PO]_2P(O)OC_5H_{11}$ |
| $(C_5H_{11})_4PSP(S)(OC_8H_{17})_2$ | $[(Naphthyl)_4PO]P(O)OC_4H_9$ |
| $(C_6H_5\text{-}CH_2)_4POP(O)(OC_5H_{11})_2$ | $[(C_6H_5)_4PO]_2P(O)O\text{-}C_6H_5$ |
| $(Cl\text{-}C_6H_3\text{-}CH_2)_4POP(O)(OC_5H_{11})_2$ | $[(Cl\text{-}C_6H_4)_4PO]_2P(O)SC_3H_7$ |
| $(Naphthyl)_4POP(O)(OC_4H_9)_2$ | |
| $(C_3H_7)_4PSP(S)(OC_2H_5)_2$ | |
| $(C_6H_5)_4POP(O)(O\text{-}C_6H_5)_2$ | |
| $(Cl\text{-}C_6H_4)_4POP(O)(SC_3H_7)_2$ | |

The novel compounds of this invention have utility for plant growth arresting, examples of which are post-emergence herbicides, plant growth retardants (which term shall include for the purposes of this disclosure secondary growth inhibitors of plant parts), and aquatic weed herbicides. To achieve the desired action on plants, the compounds may be applied in the form of solutions, emulsions, dust formulations, pastes and the like.

A liquid formulation of active component may contain an emulsifier therefor. Examples of useful emulsifiers which may be employed are Tween-20 (polyoxyethylene sorbitan monolaurate), Atlox G-2081 (a mixture of 30% alkyl aryl sulfonates and 70% polyoxyethylene sorbitan esters of mixed fatty and resin acids), Atlox 3335 (48.7% polyoxyethylene sorbitan esters of mixed fatty and resin acids, 26.3% calcium dodecyl benzene sulfonate, and 25% Solesso 100 solvent), or like agents. The emulsifier is present to the extent of about 20% of the total formulation when used for lanolin paste formulations (lanolin used at the rate of about 2 grams per 25 mg. of active component), and about 2 to 30 drops of emulsifier per gram of active component when an aqueous emulsion is desired.

In preparing an aqueous emulsion, the compound is usually dissolved in acetone or other suitable solvent, and both are then mixed with an emulsifier. Any solvent wherein the active compound and emulsifier are soluble may be used provided that (1) the solvent is volatile enough to evaporate from the plant shortly after application, or (2) it is not phytotoxic to the treated plants. Water alone may be used to dilute the solution to give the desired concentration of active compound. If the compound is water-soluble, it is merely dissolved therein to give the needed concentration, and there is no need for additional solvent.

Formulations using Pyrax, Attaclay, and the like, are prepared by mixing carrier and active ingredient in the desired proportions and grinding to a prescribed size. They may, for example, be made by adding a solution of active compound and an organic solvent such as acetone (usually containing 10% of the compound) to stirred Attaclay, then evaporating the solvent. Other solid carriers which may be used are vermiculite, talc, diatomite, bentonite, oat hulls, ground walnut shells, wood flour, Continental clay, and the like.

Liquid, dust or granular formulations containing a known quantity of active compound may be applied by any conventional means. Plants may be sprayed directly with liquid emulsions just to the point of liquid run-off. Dusts may be mixed with water prior to application, or they may be dusted onto the plants in the manner which is usual for other dust formulations. Control may be effected in some instances by applying the material to the soil in which plants are growing.

For the control of aquatic weeds, it is necessary to add a sufficient quantity of the compound to the water in which the weeds are growing to give a concentration which is effective for controlling the weed to be treated. The adjustment of concentration will obviously require a knowledge of the volume of water present in the area which is to undergo treatment.

The following examples specifically illustrate the various methods of arresting plant growth with selected compounds of the invention. Arresting, as used here, means checking the growth without serious injury to the plant (i.e. retarding growth) or stopping growth entirely (i.e. killing the plant).

(1) *Post emergence.*—Greenhouse flats one square foot in area were deep-seeded with single rows of corn and cotton and covered with soil. The entire surface of the flats was over-seeded with a mixture of rye grass and turnip seeds, and the seeds were then covered with a thin layer of soil. (In this test, corn and cotton are considered as narrow and broad leaf crop plants, while turnips and rye grass are representative of broad and narrow leaf weeds.) Immediately after planting, the seed-containing soil was bottom watered. The seeds were allowed to germinate and grow for from 10 days to two weeks and were then sprayed at the rate of about 4 pounds per acre with a formulation consisting of 0.62 gram of the active ingredient, 1 ml. of a 1:1 mixture of xylene-Atlox 3335, 39 ml. of water and 10 ml. of acetone. Results were taken about two weeks later and were recorded according to the following scale:

| No.: | Approximate percent kill |
|---|---|
| 1 | 0 |
| 2 | 1–20 |
| 3 | 21–30 |
| 4 | 31–40 |
| 5 | 41–50 |
| 6 | 51–60 |
| 7 | 61–70 |
| 8 | 71–80 |
| 9 | 81–90 |
| 10 | 91–100 |

(2) *Growth retardation (lanolin paste).*—Twenty-five mg. of the compound was mixed with 500 mg. of Tween-20 and 2.0 gm. of lanolin. The formulation was mixed well and the paste was placed in a continuous band midway on the first internode of Black Valentine beans one week after planting. Results were taken one week later by measuring the length of the first internode and comparing it with the length of the first internode of untreated plants. Results are percents retardation.

(3) *Secondary growth inhibition.*—The terminal growth of cotton seedlings above the first two true leaves was removed. Five plants (1 plant per 4″ pot) were sprayed with 1000 p.p.m. of test compound at the rate of 20 ml. per one-third square yard. The degree of secondary growth inhibition was determined by weighing the secondary growth of the plants three weeks after treatment, and comparing this weight with the weight of the secondary growth of untreated plants. Results are percents inhibition.

(4) *Aquatic weed control.*—1000 p.p.m. emulsifiable concentrates of the test compounds were prepared from 100 mg. of compound, 3 drops of Tween-20, 10 ml. of acetone and 90 ml. of water. 1 p.p.m. concentrations were prepared from this by dilution with the appropriate amount of water. 50 ml. were placed in a petri dish and 10 duckweed plants were placed therein. Results were taken one week later and were recorded on the same scale as described under (1).

| Compound | Post Emergence | | | | Percent Growth Retardation | Percent Secondary Growth Inhibition | Aquatic Weed Control |
|---|---|---|---|---|---|---|---|
| | Turn. | R.G. | Corn | Cot. | | | |
| $(C_4H_9)_4PSP(S)(OC_4H_9)_2$ | 7 | 3 | 1 | 5 | 60.0 | 27.3 | 9 |
| $2,4\text{-}Cl_2C_6H_3CH_2POP(O)(OC_8H_{17})_2$ | 9 | 2 | 3 | 9 | 93.1 | 38.9 | |
| $\underset{\mid}{(C_4H_9)_3}$ $2,4\text{-}Cl_2C_6H_3CH_2PSP(S)(SC_4H_9)_2$ | 5 | 1 | 1 | | 92.5 | | |
| $\underset{\mid}{(C_4H_9)_3}$ $2,4\text{-}Cl_2C_6H_3CH_2POP(O)(SC_4H_9)_2$ | | | | | 97.9 | | 5 |

It can be seen from the above table that some of the compounds of this invention apparently exhibit selective herbicidal activity.

What is claimed is:

1. The phosphonium phosphates corresponding to the formula

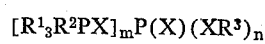

wherein $R^1$ is a member of the group consisting of lower alkyl, hydroxy-substituted lower alkyl, halo-substituted lower alkyl, phenyl, halo-substituted phenyl, lower alkyl-substituted phenyl, benzyl, halo-substituted benzyl, and naphthyl, $R^2$ has the same meaning as $R^1$, $R^3$ is a member of the group consisting of alkyl groups containing from 1 to 12 carbon atoms, phenyl, lower alkyl-substituted phenyl and halo-substituted phenyl, X is a member of the group consisting of oxygen and sulfur and $m$ and $n$ are whole numbers from 1 to 2, their sum being 3.

2. $(C_4H_9)_4PSP(S)(OC_4H_9)_2$.
3. $(2,4-Cl_2C_6H_3CH_2)(C_4H_9)_3POP(O)(OC_8H_{17})_2$.
4. $(2,4-Cl_2C_6H_3CH_2)(C_4H_9)_3POP(O)(SC_4H_9)_2$.
5. $[(2,4-Cl_2C_6H_3CH_2)(C_4H_9)_3PO]_2P(O)OC_8H_{17}$.
6. A process for the production of phosphonium phosphates which comprises reacting a phosphonium halide of the formula $$R^1{}_3R^2PY$$

wherein $R^1$ and $R^2$ are as defined in claim 1 and Y is a halogen, with a compound of the formula $$(R^3X)_nP(X)(XH)_m$$

wherein $R^3$, X, $m$ and $n$ are as defined in claim 1, said reaction being carried out in the presence of an inert solvent and a halogen acid acceptor.

7. The process according to claim 6 in which the solvent is water.
8. The process according to claim 6 in which the solvent is an inert organic solvent.
9. The process according to claim 6 in which the acid acceptor is an organic amine.
10. The process according to claim 9 in which the organic amine is triethylamine.
11. The process according to claim 6 in which the acid acceptor is an alkali metal hydroxide.
12. The process according to claim 11 in which the alkali metal hydroxide is sodium hydroxide.
13. The process of claim 6 in which the reaction is subjected to temperatures of from about 25° C. to the reflux temperature of the solvent.
14. The process of claim 6 in which $$2,4-Cl_2C_6H_3CH_2(C_4H_9)_3POP(O)(OC_8H_{17})_2$$

is produced.

15. The process of claim 6 in which $$(C_4H_9)_4PSP(S)(OC_4H_9)_2$$

is produced.

16. The process of claim 6 in which $$(2,4-Cl_2C_6H_3CH_2)(C_4H_9)_3PSP(S)(SC_4H_9)_2$$

is produced.

17. The process of claim 6 in which $$(2,4-Cl_2C_6H_3CH_2)(C_4H_9)_3POP(O)(SC_4H_9)_2$$

is produced.

18. The process of claim 6 in which $$[(2,4-Cl_2C_6H_3CH_2)(C_4H_9)_3PO]_2P(O)OC_8H_{17}$$

is produced.

19. A composition comprising a minor amount of a compound as defined in claim 1 and a major amount of an inert carrier therefor.
20. The composition of claim 19 in which the compound is $(C_4H_9)_4PSP(S)(OC_4H_9)_2$.
21. The composition of claim 19 in which the compound is $(2,4-Cl_2C_6H_3CH_2)(C_4H_9)_3POP(O)(OC_8H_{17})_2$.
22. The composition of claim 19 in which the compound is $(2,4-Cl_2C_6H_3CH_2)(C_4H_9)_3PSP(S)(SC_4H_9)_2$.
23. The composition of claim 19 in which the compound is $(2,4-Cl_2C_6H_3CH_2)(C_4H_9)_3POP(O)(SC_4H_9)_2$.
24. The composition in claim 19 in which the compound is $[(2,4-Cl_2C_6H_3CH_2)(C_4H_9)_3PO]_2P(O)OC_8H_{17}$.
25. A method for arresting the growth of plants which comprises applying thereto a growth arresting amount of a compound as defined in claim 1.
26. The method of claim 25 in which the compound is $(C_4H_9)_4PSP(S)(OC_4H_9)_2$.
27. The method of claim 25 in which the compound is $(2,4-Cl_2C_6H_3CH_2)(C_4H_9)_3PSP(S)(SC_4H_9)_2$.
28. The method of claim 25 in which the compound is $(2,4-Cl_2C_6H_3CH_2)(C_4H_9)_3POP(O)(OC_8H_{17})_2$.
29. The method of claim 25 in which the compound is $(2,4-Cl_2C_6H_3CH_2)(C_4H_9)_3POP(O)(SC_4H_9)_2$.

References Cited in the file of this patent

UNITED STATES PATENTS 2,785,967  Dye ------------------ Mar. 19, 1957

UNITED STATES PATENT OFFICE
CERTIFICATE OF CORRECTION

Patent No. 3,050,543                                      August 21, 1962

Thomas Mason Melton

It is hereby certified that error appears in the above numbered patent requiring correction and that the said Letters Patent should read as corrected below.

Column 2, line 52, Example II, in the equation, after "HOP(O)", and line 53, after "2,4-Cl$_2$C$_6$H$_3$CH$_2$" insert a dash, each occurrence; column 3, line 7, Example III, in the equation, after "(C$_4$H$_9$S)$_2$", and line 8, after "2,4-Cl$_2$C$_6$H$_3$CH$_2$" insert a dash, each occurrence; column 4, line 7, for "[2,4-Cl$_2$C$_6$H$_3$CH$_2$P$^+$(C$_4$H$_9$)$_3$O]$_2$P(O)OC$_8$H$_17$" read -- [2,4-Cl$_2$C$_6$H$_3$CH$_2$P(C$_4$H$_9$)$_3$O]$_2$P(O)OC$_8$H$_{17}$ --; columns 3 and 4, in the table, right side, third compound from the bottom should appear as shown below instead of as in the patent:

columns 5 and 6, in the table, column 1, lines 2 to 4, should appear as shown below instead of as in the patent:

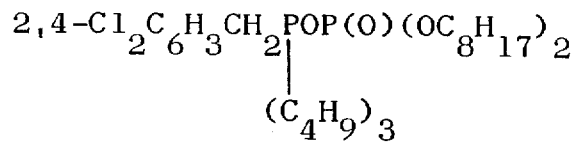

same columns, same table, column 1, last line thereof, should appear as shown below instead of as in the patent:

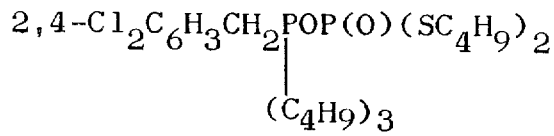

Signed and sealed this 7th day of May 1963.

(SEAL)
Attest:

ERNEST W. SWIDER                                      DAVID L. LADD
Attesting Officer                                    Commissioner of Patents